United States Patent
Patil et al.

(10) Patent No.: US 11,991,088 B2
(45) Date of Patent: May 21, 2024

(54) SYSTEM AND METHOD FOR CONGESTION MANAGEMENT IN COMPUTER NETWORKS

(71) Applicants: Rajeshwar Patil, Bengaluru (IN); Gangaraju K Siddalingaiah, Bengaluru (IN); Kemparaju Sannamariyappa, Bengaluru (IN)

(72) Inventors: Rajeshwar Patil, Bengaluru (IN); Gangaraju K Siddalingaiah, Bengaluru (IN); Kemparaju Sannamariyappa, Bengaluru (IN)

( * ) Notice: Subject to any disclaimer, the term of this patent is extended or adjusted under 35 U.S.C. 154(b) by 0 days.

(21) Appl. No.: 17/519,001

(22) Filed: Nov. 4, 2021

(65) Prior Publication Data

US 2022/0141148 A1 May 5, 2022

(30) Foreign Application Priority Data

Nov. 4, 2020  (IN) .............................. 202011048198
Nov. 4, 2021  (EP) ..................................... 21206377

(51) Int. Cl.
*H04L 47/6275* (2022.01)
*H04L 47/22* (2022.01)
*H04L 47/2475* (2022.01)

(52) U.S. Cl.
CPC .......... *H04L 47/6275* (2013.01); *H04L 47/22* (2013.01); *H04L 47/2475* (2013.01)

(58) Field of Classification Search
None
See application file for complete search history.

(56) References Cited

U.S. PATENT DOCUMENTS

| 6,118,790 A * | 9/2000 | Bolosky ............. H04N 7/17336 370/468 |
| 6,996,062 B1 * | 2/2006 | Freed ....................... H04L 47/10 370/252 |
| 2005/0201284 A1 * | 9/2005 | Cheriton ................. H04L 47/20 370/232 |

(Continued)

OTHER PUBLICATIONS

Extended European Search Report, European Patent Office, on corresponding EP Application No. 21206377.0, dated Mar. 21, 2022.

*Primary Examiner* — Lonnie V Sweet
(74) *Attorney, Agent, or Firm* — Amarok IP Inc.; Neil W. Henderson

(57) ABSTRACT

A method for congestion management on a computer network including: receiving a packet from a traffic flow; determining at least one attribute associated with the packet; determining a priority level for the packet based on the at least one attribute; determining a queue depth for a queue in a data plane path of the packet; determining whether to send or drop the packet based on the priority level and the queue depth. A system for congestion management including: an incoming packet handler configured to receive a packet; an application detector configured to determine at least one attribute associated with the packet; a policy module configured to determine a priority level for the packet based on the at least one attribute; an enhanced weighted random early detection module configured to determine a queue depth and whether to send or drop the packet based on the priority level and the queue depth.

19 Claims, 9 Drawing Sheets

(56) References Cited

U.S. PATENT DOCUMENTS

| | | | | |
|---|---|---|---|---|
| 2007/0053352 A1* | 3/2007 | Corcoran | | H04L 47/31 |
| | | | | 370/389 |
| 2007/0201365 A1* | 8/2007 | Skoog | | H04L 47/19 |
| | | | | 370/230.1 |
| 2009/0296670 A1* | 12/2009 | Luo | | H04W 28/12 |
| | | | | 370/338 |
| 2010/0094989 A1* | 4/2010 | Li | | H04N 21/658 |
| | | | | 709/224 |
| 2013/0163430 A1* | 6/2013 | Gell | | H04N 21/6131 |
| | | | | 370/235 |
| 2014/0164640 A1* | 6/2014 | Ye | | H04L 47/12 |
| | | | | 709/235 |
| 2016/0112896 A1* | 4/2016 | Karampatsis | | H04L 47/32 |
| | | | | 370/230.1 |
| 2016/0219088 A1* | 7/2016 | Ma | | H04L 65/765 |
| 2016/0337142 A1* | 11/2016 | Attar | | H04L 49/901 |
| 2018/0123983 A1 | 5/2018 | Gunner | | |
| 2020/0112983 A1* | 4/2020 | Hosseini | | H04L 1/18 |
| 2020/0136777 A1* | 4/2020 | He | | H04L 5/0007 |
| 2021/0365253 A1* | 11/2021 | Zhai | | G06F 8/47 |

\* cited by examiner

SYSTEM AND METHOD FOR CONGESTION MANAGEMENT IN COMPUTER NETWORKS

FIELD

The present disclosure relates generally to handling of computer network traffic. More particularly, the present disclosure relates to a system and method for congestion management in computer networks.

BACKGROUND

Online network traffic continues to increase. Internet Service Providers (ISPs) and other network providers are trying to manage subscriber quality of experience (QoE), quality of service (QoS) and network capital costs. As video streaming is increasingly common at higher definitions as well as online gaming being a common past time, there are frequently points of time a network may become congested to the point of being overflowing or having issues with QoE or QoS. When the network is too congested, packets may be dropped, and traffic flows may be interrupted.

Network providers wish to keep the subscriber's enjoying their experience but may not have the capital to upgrade the network in order to be congestion free. Further, if there are only periods of congestion, it may not be worthwhile to upgrade the underlying network devices if other traffic actions may reduce the congestion or ameliorate the subscriber experience or service. As such, there is a need for an improved system and method for congestion management.

The above information is presented only to assist with an understanding of the present disclosure. No determination has been made, and no assertion is made, as to whether any of the above might be applicable as prior art with regard to the present disclosure.

SUMMARY

In a first aspect, there is provided a method for congestion management on a computer network, the method including: receiving a packet from a traffic flow; determining at least one attribute associated with the packet; determining a priority level for the packet based on the at least one attribute; determining a queue depth for a queue in the data plane path of the packet; determining whether to send or drop the packet based on the priority level and the queue depth.

In some cases, determining a queue depth may include: determining a minimum congestion threshold for the queue; determining a maximum congestion threshold for the queue; if the queue depth is below the minimum congestion threshold, allowing all packets to be sent; if the queue depth is between the minimum congestion threshold and the maximum congestion threshold determining a sending priority level for packets; if the queue depth is above the maximum congestion threshold, dropping packets entering the queue.

In some cases, minimum congestion threshold may be 20% and the maximum congestion threshold may be 80%.

In some cases, dropping the packet may include setting congestion experienced bit to congested.

In some cases, the at least one attribute may include: at least one traffic flow attribute, at least one subscriber attribute or at least one session attribute.

In some cases, the at least one traffic flow attribute may include application type for the traffic flow.

In some cases, the method may further include: if the packet is dropped, flagging the traffic flow as having been previously dropped and determining the priority level of a subsequent packet of the traffic flow based on whether the traffic flow was flagged.

In some cases, the queue may be associated with a data plane device.

In some cases, the queue may be associated with a shaper.

In some cases, the shaper may include a plurality of queues and determining a queue depth for each queue.

In another aspect, there is provided a system for congestion management on a computer network, the system including: an incoming packet handler configured to receive a packet from a traffic flow; an application detector configured to determine at least one attribute associated with the packet; a policy module configured to determine a priority level for the packet based on the at least one attribute; an enhanced weighted random early detection module configured to determine a queue depth for a queue in the data plane path of the packet and whether to send or drop the packet based on the priority level and the queue depth.

In some cases, the enhanced weighted random early detection module may be configured to: determine a minimum congestion threshold for the queue; determine a maximum congestion threshold for the queue; if the queue depth is below the minimum congestion threshold, allow all packets to be sent; if the queue depth is between the minimum congestion threshold and the maximum congestion threshold determine a sending priority level for packets; if the queue depth is above the maximum congestion threshold, drop packets entering the queue.

In some cases, the minimum congestion threshold may be 20% and the maximum congestion threshold may be 80%.

In some cases, the enhanced weighted random early detection module may be configured to set a congestion experienced bit to congested instead of dropping the packet.

In some cases, the at least one attribute may include: at least one traffic flow attribute, at least one subscriber attribute or at least one session attribute.

In some cases, the at least one traffic flow attribute may include application type for the traffic flow.

In some cases, the enhanced weighted random early detection module may be configured to: if the packet is dropped, flag the traffic flow as having been previously dropped and determine the priority level of a subsequent packet of the traffic flow based on whether the traffic flow was flagged.

Other aspects and features of the present disclosure will become apparent to those ordinarily skilled in the art upon review of the following description of specific embodiments in conjunction with the accompanying figures.

BRIEF DESCRIPTION OF FIGURES

Embodiments will now be described, by way of example only, with reference to the attached Figures.

DETAILED DESCRIPTION

Generally, the present disclosure provides a method and system for congestion management on a computer network. The system and method are configured to receive a packet from a traffic flow; and determine at least one attribute associated with the packet. The attribute may be associated with the traffic flow or with the subscriber or session associated with the packet. The system and method may determine a priority level for the packet and associated traffic flow based on the at least one attribute.

The system and method may then determine a queue depth for a queue in the data plane path of the packet. In some cases, the queue may be for a data plane device. In other cases, the queue may be a shaper queue. The system and method may then determine whether to send or drop the packet based on the priority level and the queue depth.

Generally speaking, a computer network includes a data plane, through which user packets are transmitted, and a control plane, which carries information about the network itself. Data plane devices generally include traffic shapers which have data packet queues internally. Traffic shaping, generally referred to as shaping, manages data traffic by constraining specific types of traffic within a limited amount of bandwidth. A shaper is configured to discard excess traffic beyond a configured bandwidth or shaper rate according to the shaper's pre-configured rules. Shapers tend to use queues in the shaping process. When traffic enters the shaper, the traffic is placed in a queue. Based on the configured shaper rate, the shaper removes the traffic from the queue, and subsequently, traffic exits the shaper.

Data plane devices have egress packet queues to handle bursts of traffic. Whenever there is burst of traffic seen, some of the packets are queued in the egress queue and sent, out subsequently.

Figure 1:
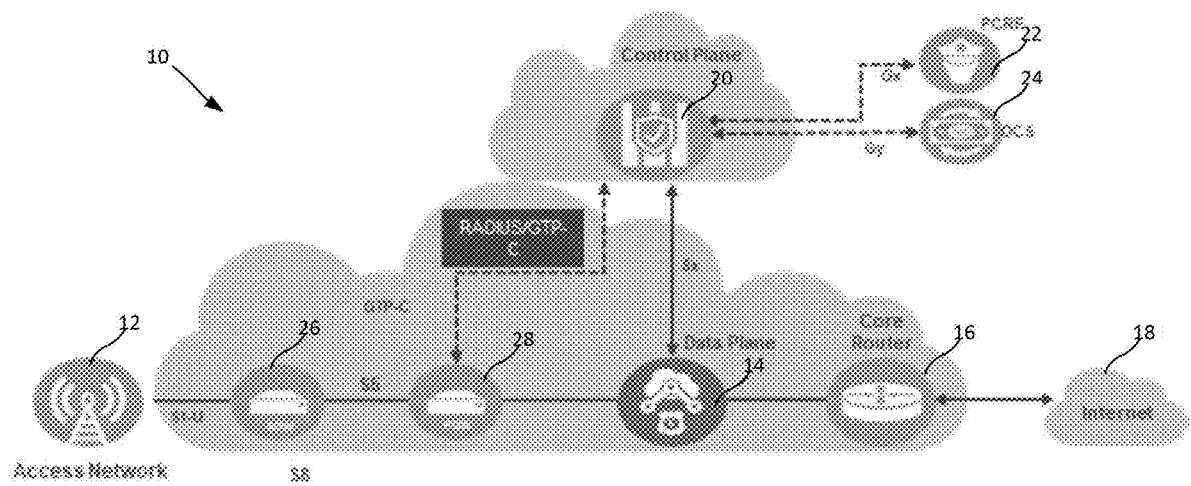
FIG. 1 illustrates an network environment for the system for congestion management, according to an embodiment.

FIG. 1 illustrates a network environment 10 as an illustration for embodiments of the system and method. An access network 12 is intended to direct traffic through a data plane 14 to a core router 16 then to the internet 18. The data plane 14 interacts with a control plane 20 and control plane network devices, for example a Policy Charging Rule Function (PCRF) 22 and an Online Charging System (OCS) 24 in order to direct and track network data. Traffic is intended to be directed through a Serving Gateway (SGW) 26 and a Packet Gateway (PGW) 28. It will be understood that this is one possible deployment of a data plane and that, in some environments, the data plane may be able to function without a control plane.

In a conventional tail drop method, data plane devices buffer packets until their egress (outgoing) queue is full. Data plane devices have packet queues to allow them to hold packets when the network is busy rather than discarding the packets. The egress queue typically has configured (limited) capacity because of limited resources on data plane devices. Once this queue fills up, data plane devices generally drop the packets the device is unable to buffer/queue. If these queues are constantly full, the network is considered congested. This method of dropping packets on queuing failures is called tail drop. The tail drop method may distribute buffer space unfairly among traffic flows. The tail drop method may also lead to a phenomenon known as TCP global synchronization, as all TCP connections "hold back" simultaneously, and then step forward simultaneously. Networks become under-utilized and flooded—alternately, in waves.

The sudden burst of traffic may cause large numbers of established Transmission Control Protocol (TCP)/Internet Protocol (IP) streams to lose packets simultaneously. TCP has automatic recovery from dropped packets, which the process interprets as congestion on the network. The sender reduces its sending rate for a certain amount of time (a predetermined interval), and then tries to find out if the network is no longer congested by increasing the rate and the predetermined intervals. This process is known as a slow start method.

Most TCP senders generally use the same time delay before increasing their rates. These delays expire at similar times and all the senders will begin to send additional packets. The data plane device's queue will again overflow, more packets get dropped, the senders will back off for a fixed delay and this cycle begins to repeat itself, again and again. This pattern of all senders decreasing and increasing transmission rates at similar times is referred as "global synchronization" and leads to inefficient use of bandwidth, due to the large numbers of dropped packets and large number of retransmitted packets and have a reduced sending rate compared to the stable state following each loss.

Figure 2:
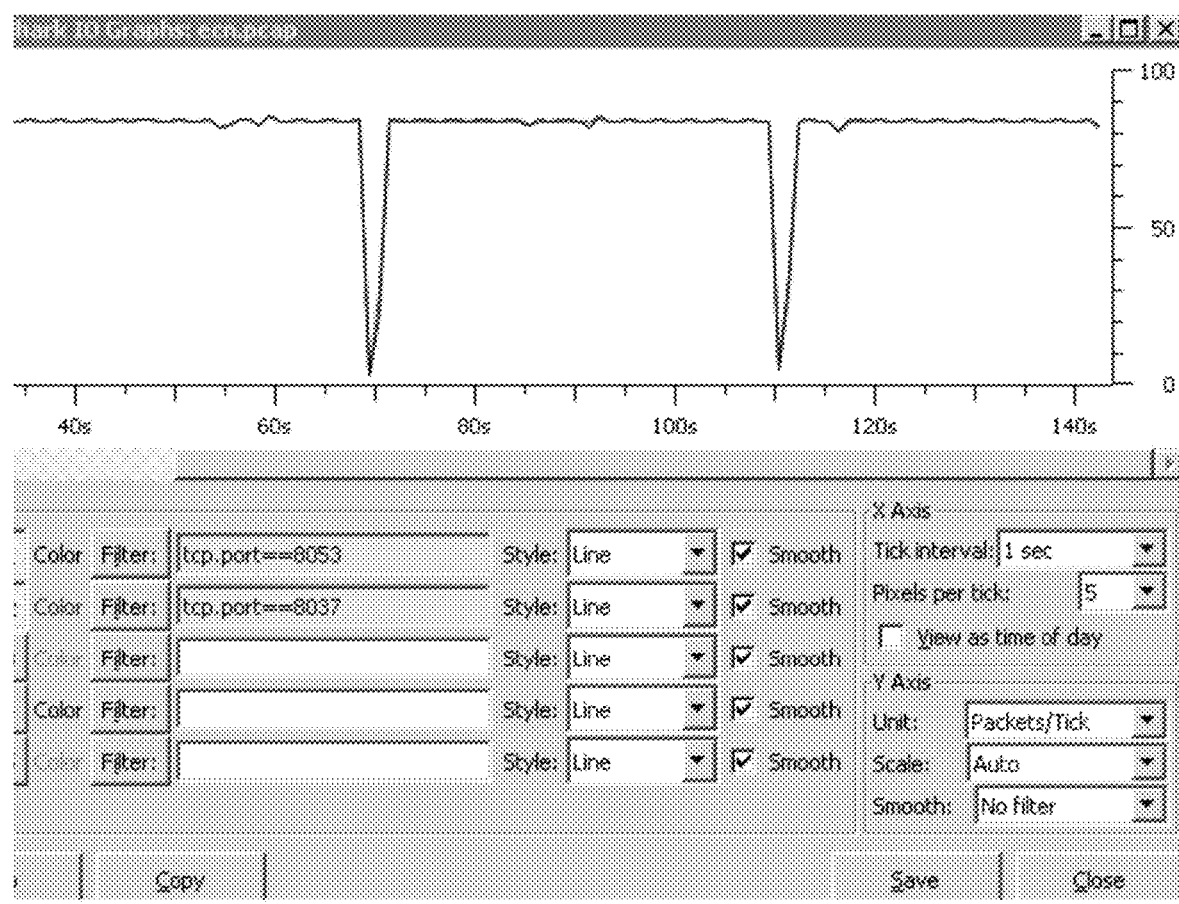
FIG. 2 illustrates a graph demonstrating the issue of global synchronization.

FIG. 2 is a diagram showing the issue of global synchronization for two TCP flows. In the diagram, the X axis has timestamp and Y axis has number of packets per interval. The graph illustrates when the queue at the data plane overflows. With the tail drop method, packets of both the flows will be dropped. As both the flows slow down at the same time, they will also ramp up at the same time causing global synchronization. It can further be seen that the data plane here is subscriber aware by communicating with other network devices in order to determine application and subscriber attributes. The data plane may communicate with, for example, a Policy and Charging Rules Function (PCRF), Online Charging System (OCS), Radius, Gtcp-c, and the like. An issue of global synchronization may impact the QoS of the TCP and UDP flows, which happens during traffic burst and congestion.

Global synchronization may further cause network under-utilization as well as a burst of traffic. This cycle of low traffic and burst of traffic continues until amount of traffic reduces. This cycle may occur because instead of discarding many segments from one connection, the data plane is discarding one segment from each connection. When these drops happen, the high priority applications (for example, VoIP, live streaming and the like) or low priority applications like P2P, backup of applications (for example, WhatsApp backup, google backup, and the like) all are impacted. Generally speaking, all the subscriber applications may have a resulting poor Quality of Service (QoS) while the subscribers may suffer a low Quality of Experience (QoE).

This noted issue has been observed and appears to exist on the data plane's queues, for example, the egress queue, the virtual queues used for the shapers where these shapers are per location, APN, Rat-Type (3G, 4G, 5G), subscriber's quota consumption, 5G traffic classification (eMBB, URLLC, mMTC), subscriber, Data Application (Facebook, YouTube, Netflix, and the like) during traffic burst and congestion.

In the case of shapers, in an example there may be a shaper that is per location of subscribers. If there is burst of traffic for that location, the shaper's queue fills up causing a drop of TCP or UDP packets of all flows from that location causing global synchronization for all subscribers of that location.

The same situation may apply to data applications. In a specific example, there may be a shaper of 2 Mbps (Megabits per second) per subscriber. In this example, if a subscriber has a slight burst of traffic, for example, the subscriber has one YouTube™ video being streamed slightly above 1.5 Mbps, and a file downloading at 1 Mbps, this may cause a shaper's queue to overflow causing both the YouTube stream and File Download flows to suffer. In this example, if instead of dropping packets from both flows, packets from the file download flow were set to be dropped because of its lower priority, then the YouTube video would continue to stream properly without interruption. In some cases, a subscriber may have a plurality of sessions, as a subscriber may purchase more than a single SIM card and have a plurality of sessions tied to the same subscriber.

Conventional solutions to address this problem have tended to be subscriber attribute unaware in that the solution had no knowledge with respect to, for example, application, location, Access Point Name (APN), Rat-Type (3G, 4G, 5G), subscriber's quota consumption, 5G traffic classification (eMBB, URLLC, mMTC), subscriber, or the like. These conventional solutions generally treat all the TCP and UDP flows with equal priority. The data plane devices handle the global synchronization by dropping the packets early, but these devices are unaware of the criticality of the flows. The results of these conventional solutions have been found to cause bad QoS and/or bad Q-E on the critical flows of premium subscribers, for example, for VoIP, live streaming flows, and the like.

With shapers, conventional solutions have frequently left the problem of TCP global synchronization unaddressed and have generally treated all flows as having the same priorities. Embodiments of the proposed system and method are intended to provide for shaping that is subscriber attribute aware or subscriber session attribute aware as well as shaping that does not result in global synchronization. The embodiments of the system and method detailed herein provide an approach when subscriber or application aware shapers queue overflows. Conventionally, in a case of overflows, packets are dropped which affects all the flows. The proposed embodiments of the system and method are intended to reduce the probability of queues filling by proactively dropping low priority traffic based on preconfigured thresholds.

Weighted random early detection (WRED) is a queuing discipline suited for congestion avoidance. It is an extension to random early detection (RED) where a single queue may have several different sets of queue thresholds. Each threshold set can be associated to a particular traffic class. For example, a queue may have lower thresholds for lower priority packets. A queue buildup will cause the lower priority packets to be dropped, hence protecting the higher priority packets in the same queue. In this way, quality of service prioritization is made possible for important packets from a pool of packets using the same buffer or queue. This provides for the lower priority or standard traffic to be dropped instead of higher prioritized traffic.

Figure 3:
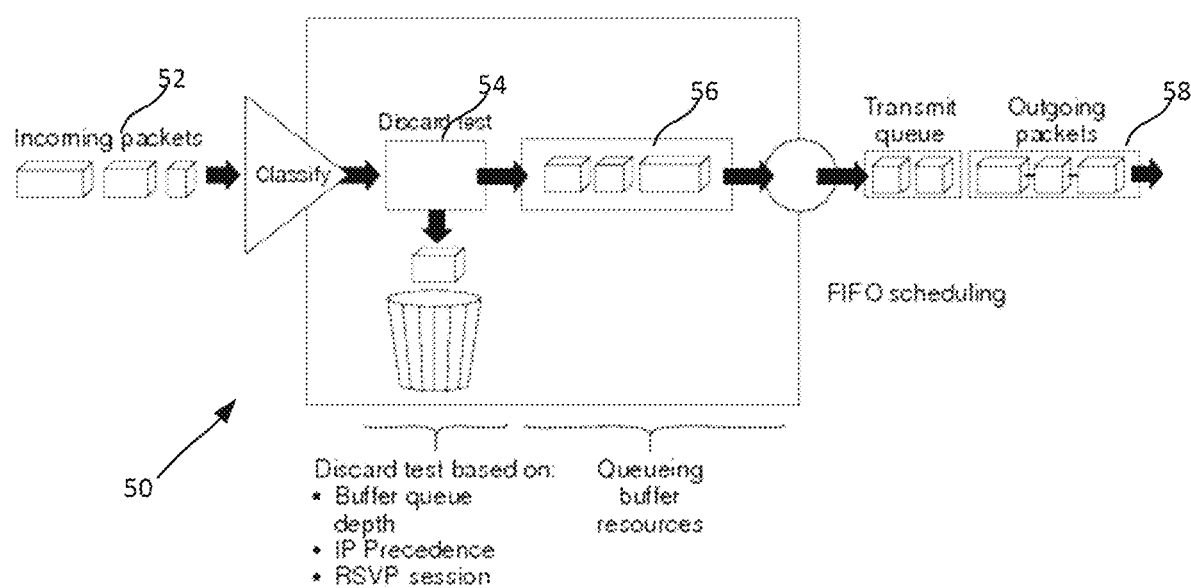
FIG. 3 illustrates a method for WRED packet dropping for congestion management, according to an embodiment.

FIG. 3 illustrates a method 50 for WRED packet dropping based on a queue according to an embodiment herein. In particular, an incoming packet 52 is reviewed and classified. Once classified, the packet may be a candidate to be dropped based on, for example, a discard test 54 which may consider various factors. Based on these decisions, the packet will either be entered into the queue 56 unchanged, the packet will be dropped or an Explicit Congestion Notification (ECN) bit may be set on the packet so that the sender slows down the rate of packet transmissions. Packets in the queue may then be transmitted and may be considered outgoing packets 58.

ECN is an extension to the Internet Protocol and to the TCP.ECN allows end-to-end notification of network congestion without dropping packets. ECN is an optional feature that may be used between two ECN-enabled devices. An ECN marked patent allows for congestion management, without having a packet drop or packet retransmissions.

Conventionally, TCP/IP networks signal congestion by dropping packets. When ECN is successfully negotiated, an ECN-aware data plane device may set a mark in the IP header instead of dropping a packet in order to signal impending congestion. The receiver of the packet echoes the congestion indication to the sender, which reduces its transmission rate as if it detected a dropped packet. For the embodiments of the system and method detailed herein, a packet drop or a set congestion experienced bit in the IP header may be referred to as a packet drop as they produce similar behaviors in the sender and receiver. It will be understood that both solutions can provide for reduced or slowed traffic flow.

As noted with reference to FIG. 1, there may be two main queues on a data plane, an egress queue and virtual queue for the shapers.

Egress queues tend to rely on either RED/WRED methods to solve the global synchronization problem. Conventionally, WRED methods rely on the IP layer Differentiated Services Code Point (DSCP) fields to prioritize the traffic flows and packets. Conventional methods are not subscriber aware, which means these solutions are not aware of premium subscribers, subscriber's location, subscriber's APN, Rat-Type (3G, 4G, 5G), subscriber's quota consumption, 5G traffic classification (eMBB, URLLC, mMTC), whether subscriber is roaming or non-roaming, the plan of the subscriber, tethered, application of the traffic whether it is YouTube™, Netflix™, Facebook™, or the like.

Conventional methods have not been traffic flow aware, as these methods do not keep track of the flows for whom packets have been dropped. These conventional methods tend to keep applying drop action to different flows rather than remembering the older flows for which packet drops were previously done.

It has been noted that the shaper's queues generally do not resolve the above mentioned two problems, namely, global synchronization, and differentiation based on priority of the flow. As such, there have been noted shortcomings with existing shaper methods during congestion and traffic burst. In particular, it has been noted that shapers may introduce global synchronization with no differentiation between critical flows and low priority flows. Further, egress queues of existing data plane's do not take decisions based on the traffic flow or subscriber's attributes, such as, for example, APN, Rat-Type (3G, 4G, 5G), subscriber's quota consumption, 5G traffic classification (eMBB, URLLC, mMTC), location, roaming property, subscriber's plan, subscriber's quota consumption, data applications or the like. As such, it has been noted that conventional solutions impact QoS and/or QoE for high priority applications, premium subscribers, and the like.

Such non-subscriber aware drop conventional solutions can cause revenue loss to an ISP because, for example, the ISP can charge more to roaming subscribers by allowing their traffic or may have premium subscribers churn (loss of subscribers) when QoS and/or QoE is impacted. As traditional solutions may not recognize roaming flows, they may drop all roaming packets or premium subscriber packets during times of congestion.

Embodiments of the system and method detailed herein are intended to be associated with a data plane device but also recognize roaming flows, for example, via Deep Packet Inspection (DPI) or other known methods, which is intended to allow more traffic to provide higher revenue to ISP.

During congestion or bursts of traffic, embodiments of the method and system are intended to ensure that the egress queues and shapers queues are configured to make use of enhanced Weighted Random Early Detection (WRED). The enhanced WRED is intended to have intelligence to classify the flows in various categories or traffic classes based on characteristics or attributes of the flow or subscriber such as, for example:

- The subscriber's plan: for example, classifying traffic from subscribers with premium as high priority class thereby reducing their drop probability;
- The Application of the flow: for example, the flows specific to time critical data applications like VoIP, live streaming and the like can be classified using Deep Packet Inspection (DPI) under high priority class thereby reducing their drop probability;
- Roaming status: where roaming flows can be classified under high priority class or low priority class based on the policies of the ISP
- APN of the subscriber: where Subscribers belonging to the high priority, time critical APN could be classified under high priority class like VoLTE APN get high priority and internet APN gets low.
- Subscriber's location: where subscribers from congested cells could be given lower priority.
- Tethering: where priority could be different whether subscriber is tethering or not.
- The Radio Access Type (RAT), for example, 3G, 4G, 5G or the like, where the RAT of the subscriber could be accessed on data plane and traffic prioritization could be done based on the RAT, for example, 5G subscribers could be assigned high priority compared to 3G subscribers.
- The 5G traffic prioritization: The data plane can classify the traffic based on 5G priorities, for example, eMBB, eURLLC, mMTC. The data plane may assign high priority to the traffic that belongs to eURLLC and low priority to mMTC.
- The subscriber's quota: Subscribers who have run out of quota can be assigned lower priority.

The above characteristics or attributes represent some examples that may be provided through embodiments of the system and method detailed herein. Embodiments of the system and method may further be configured to provide congestion management based on other subscriber or session attributes, or on a combination of more than one subscriber and/or session attribute. In some cases, the system and method may be configured by an operator based on the requirement/use case.

Embodiments of the system and method may further be configured to store and remember which flow's packets were dropped, so that next time if drop action needs to be taken on two similar priority flows, then this decision may already be marked as to which flow should be picked. It is intended that this will not affect the QoS on a new flow.

Once a traffic flow has been classified, embodiments of the system and method are intended to drop low priority flows early during traffic burst avoiding global synchronization and bad QoS and/or QoE for all flows. Dropping lower priority flows first is intended to provide for effective network use and good QoS and/or QoE for premium and/or time critical flows.

Embodiments of the system and method are intended to be applied to queues maintained by the shapers and the egress queue on the data plane. It is intended that embodiments of the system and method will allow shapers to address the global synchronization issues while still providing a high level of QoS and/or QoE for higher priority flows during traffic burst and congestion. Further, embodiments of the system and method detailed herein are intended to provide subscribers over high speed RAT-Type (3G, 4G. 5G) better service during traffic burst and congestion. In some cases, the Ultra-reliable low-latency communication (URLCC) traffic of 5G gets higher priority and better QoS during traffic burst and congestion compared to, for example, eMBB, mMTC traffic.

In some cases, subscribers with premium plans may be prioritized to receive higher service during traffic bursts and congestion. In some cases, subscribers who have consumed their quota may receive lower service compared to subscribers who still have quota during the traffic burst and congestion. In some cases, time critical data applications like VoIP, video streaming and the like may get higher QoS and/or QoE as being prioritized higher during traffic burst and congestion. In some cases, roaming subscribers could be allowed or disallowed during traffic burst and congestion based on previously configured ISP policies.

In some cases, embodiments of the system and method may be configured to prioritize subscribers connected to high priority APN's like VoIP to provide these subscribers with better QoS compared to Internet APN during traffic burst and congestion. In some cases, subscribers could be given a higher QoS or an average QoS during traffic burst and congestion based on the location of the subscriber. In some cases, tethered subscribers or heavy data users may not get the same high level of QoS during traffic burst and congestion as non-tethered or lower data user subscribers.

Figure 4:
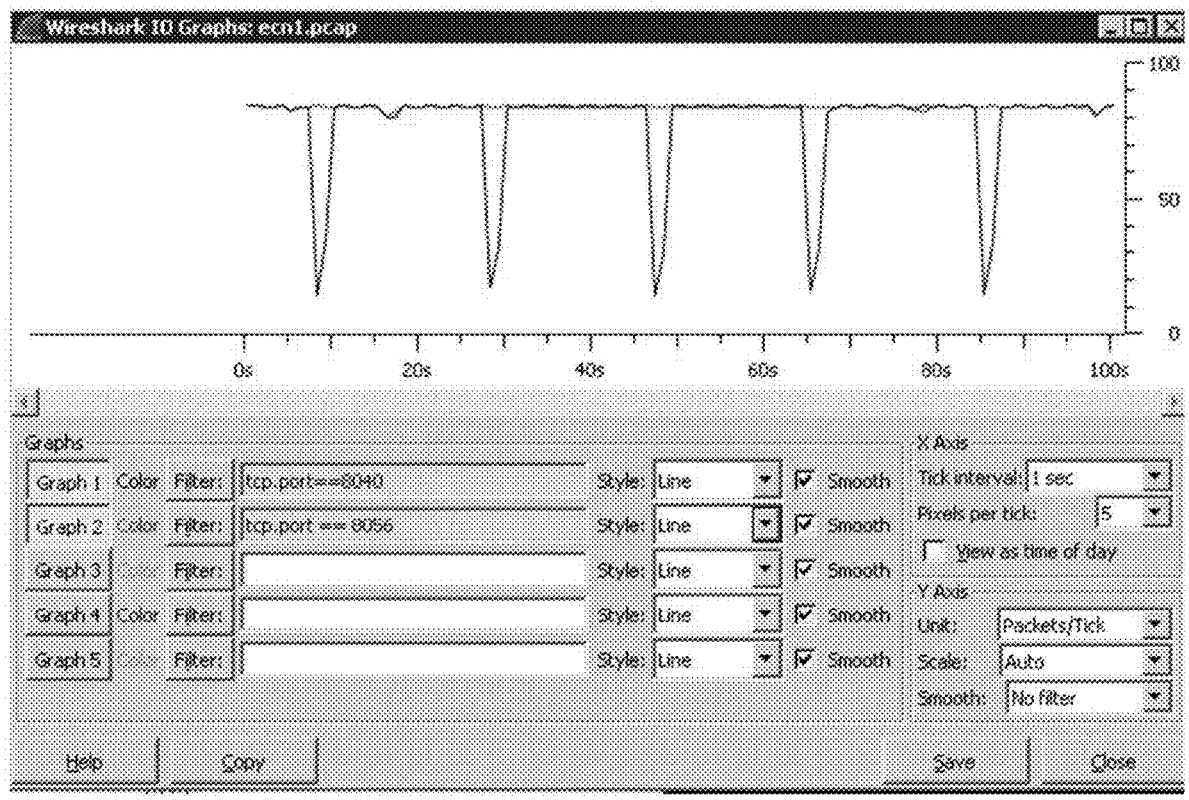
FIG. 4 illustrates a graph of two flows which do not suffer from global synchronization.

FIG. 4 illustrates two traffic flows that have been reviewed by the system and have had the method for congestion management applied by congested shaper/network. As a simplified example, only two flows are shown, and only a single flow has been slowed. The second flow has a steady rate and continues uninterrupted. Although the QoS of the low priority flow is impacted, higher priority flows like VoIP and streaming are intended to be unaffected during congestion and traffic burst.

A traffic flow may be uniquely identified using, for example, 5-tuple information such as: source IP address, Source port, destination IP address, Destination port, Layer 4 protocol like TCP, UDP, Stream Control Transmission Protocol (SCTP). The system is configured to classify each flow into a traffic class based on the data associated with the traffic flow which may be recognized by the 5-tuple information and from deep packet inspection.

In a specific example, traffic classes or priority levels could vary between 1 to 10 based on configuration predetermined by the ISP or preconfigured by the system. In this example, 1 may be time critical and high priority application flows, 5 being average priority, 10 being least priority flow. It will be understood that different scales are possible.

It will be understood that there are several manners in which to classify traffic flows to various levels of priority. In some cases, there may be at least one rate shaper, which may include, for example, one or more of shapers per location, shapers per mobile virtual network operator (MVNO), shapers per APN, shapers per cell, shapers per subscribers, shapers per application, or the like. When the system determines a flow is seen or accessed in the data plane network device, the system may determine a priority index or traffic class for the flow based on preconfigured policies as detailed herein. Then the flow may be directed to an appropriate shaper.

In some cases, there may be application based classifications of the traffic flows. The application type, a traffic flow attribute, may be recognized using Deep Packet inspection. In some cases, high priority flows, for example, VoIP, Live Streaming, gaming, and the like, may be assigned priority 1. Lower priority flows may be assigned a 10, for example flows such as, P2P flows, background application backup, background app updates, and the like. For medium priority applications, for example, web browsing, may be assigned an average class of 5. A static configuration, like this example, may be preconfigured or created at the initialization of the data plane or of the system.

In a further example, the traffic may be classified based on for example, 5G URLLC, Enhanced mobile broadband (eMBB), Massive Machine-type communication (mMTC). The traffic that belongs to URLLC may be assigned priority 1 and the traffic that belongs to eMBB may be assigned priority 5 and mMTC may be assigned priority 10.

In another example, the traffic may be prioritized by the subscriber quota consumption. In particular, the traffic belonging to subscribers who have consumed quota could be assigned priority 10 and the traffic belonging to subscribers having quota can be assigned priority 1. Subscribers with valid quota would be configured to receive better QoS during traffic burst and congestion than subscribers that have overused their quota.

For, Radio Access Type based classification, the traffic belonging to 5G Radio type can be assigned priority 1 and 4G Radio Type can be assigned priority 5 and 3G subscribers can be assigned priority 10. A network operator may define a policy in order to provide for this classification. In advertising, the operator may state that there is better speed in 5G and then in 4G and then in 3G during congestion hours. In conventional solutions, during congestion, it is likely that all 5G, 4G, and 3G would be given the same speed because during congestion data plane uses tail drop method and drops all packets regardless of looking at their RAT-Type. It is intended, that with the system and method detailed herein, during congestion, 5G flows are dropped only when congestion is very high after 4G and 3G have already been affected.

In some cases, the traffic level or classification may be based on the subscriber's plan. The subscriber with Plan Gold can be assigned priority 1. The subscriber with Plan Silver can be assigned priority 5. The subscriber with Plan Bronze can be assigned priority 10. When a flow for the subscriber is seen, the flow may be marked with subscriber's priority index. For example, all the flows of Gold subscribers will be marked with priority index 1.

Traffic classification may also include roaming/non-roaming classifications. In particular, the subscribers that are roaming can be assigned least priority or high priority based on the policy of the ISP. When the system determines a traffic flow is from a roaming subscriber, the flow will be marked with priority index number.

In still another example, the traffic flows may be prioritized or given a class based on whether the subscriber is a heavy user of the network or a tethered subscriber. The subscribers that are tethering or using internet at very high speed and have consumed most of the bandwidth. All the flows seen for those subscribers could be marked with least priority index 10.

In still another example, the subscribers' traffic flow class may be associated with the APN of the subscriber. The subscribers that are connected to the high priority APN like P Multimedia Core Network Subsystem (IMS) could be assigned high priority 1, so flows that belong to such subscribers are marked with classifier 1.

The above methods may be used to classify the data traffic flows. In some cases, more than one attribute may be used in order to classify a traffic flow and provide the traffic flow a priority. In some cases, there may be factors that are weighted higher and may affect the level of the traffic flow more than others, in some cases, it may just be an average of priorities that is assigned as the level of the traffic flow. It will also be understood that although a scale of 1 to 10 is used in the examples, a different scale may be used by the system and method for congestion management. If more than one attribute is used then priority could be determined by, for example, a sum of priorities of each attribute, or select any priority one of the attributes. It will be understood that variable and configurable implementations may be used.

Each flow may be configured to have a 32 bit integer flow priority index that would store the priority index of the flow until flow ends. The data plane network devices are configured to keep flow details and attributes until the end of the flow. Further, a Boolean flag per flow can be used to keep track of whether the flow has been previously dropped before or not. This flag would be updated once the flow has been dropped.

Once the flows have been classified, each flow is intended to be reviewed via an enhanced WRED. The packets of the traffic flow may be queued on network, congestion or burst of traffic on the network.

The method is configured to determine a queue depth and, when a packet is added to the queue, the average queue depth may be determined. When the average queue depth is below the minimum congestion threshold (for example, 10%, 20%, or another preconfigured threshold determined by the ISP or by the system), the system is configured to provide instruction to the data plane to not drop any packets. When the average queue depth is above the minimum threshold, the system may provide instructions to the data plane to start to drop packets with the priority index greater than a predetermined threshold, for example, greater than 8 (although a different threshold may be selected). When the average queue depth increases even further, the system may provide for the data plane to drop a larger percentage of packets until a maximum threshold is reached. In some cases, the maximum congestion threshold may be 75%, 80% or another percentage. As the queue depth increases, the system may determine to drop packets of higher priority claims. For example, if the queue depth is 70%, then all the flows having index greater than, for example, 33, would be dropped. When the average queue depth reaches the maximum threshold, the system may provide for all packets to be dropped.

Figure 5:
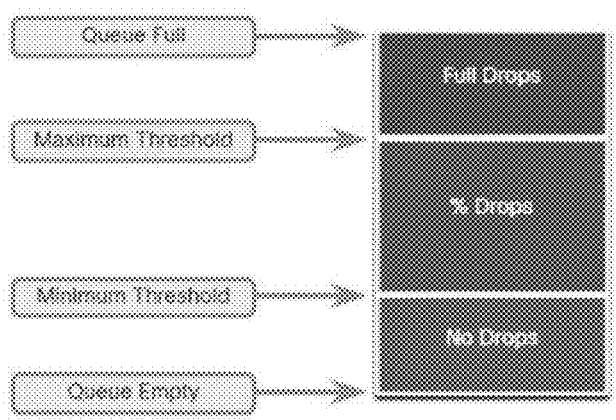
FIG. 5 illustrates various levels of a queue according to an embodiment of the method for congestion management.

FIG. 5 illustrates an example of dropping packets based on the queue depth according to an embodiment herein. In particular, the system is configured such that as the drop probability grows, higher percentages of incoming packets are dropped based on the priority of the flows. If the data packet that has been marked for deletion has ECN support, then system may provide for the data plane to set the CE (Congestion Experienced) bit in the IP header. If data packet does not support ECN, the packet will be dropped. If data packet is not marked for deletion the CE bit for that packet will not be modified by the system.

Figure 6:
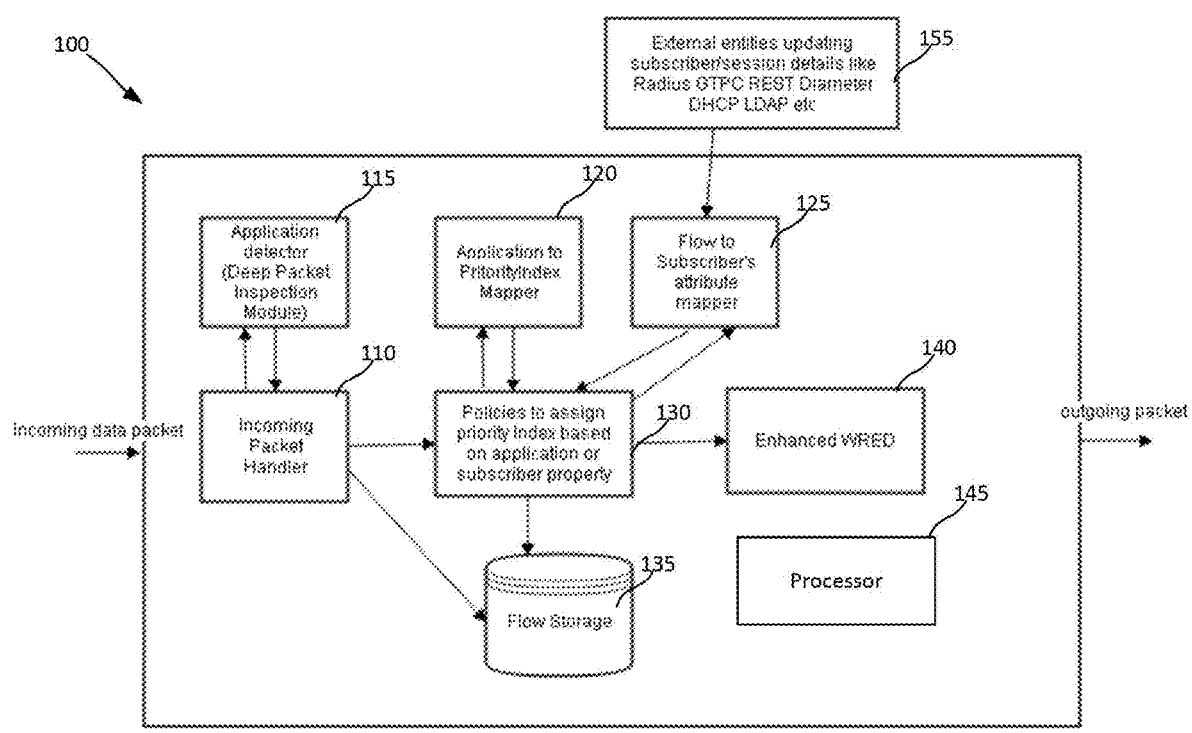
FIG. 6 illustrates a system for congestion management, according to an embodiment.

FIG. 6 illustrates a system 100 for congestion management according to an embodiment herein and the system's interactions with the packet of a traffic flow. The system 100 includes an incoming packet handler 110, an application detector 115, an application to Priority Index Mapper 120, a flow to subscriber attribute mapper 125; a policy module 130, storage 135, an enhanced WRED Module 140 and at least one processor 145. The system is generally intended to reside on the core network but may be distributed and may be inline with the traffic flow. The modules, including the processor 145 and memory 135, are in communication with each other but may be distributed over various network devices or may be housed within a single network device.

When a packet arrives in the data plane, the system 100 may receive the packet via the incoming packet handler 110. The incoming packet handler 110 provides the packet to the application detector 115, which is intended to include a Deep Packet Inspection Module. The application detector 115 detects attributes associated with the packet, for example traffic flow attributes, subscriber attribute, session attributes and the like. In some cases, the application detector 115 may determine the application of that flow, which may be for example, YouTube, Facebook, Netflix, and the like. In some cases, traffic flow attributes may further include attributes such as IP class, VLAN/MPLS tags, Server IP address and the like.

Then, if the flow is to have a priority index based on the subscriber, the policy module 130 is configured to interact with flow to subscriber's attributes mapper 125 and based on subscriber's attribute decides the flow priority index, for example, gold subscribers will have high priority index. It will be understood that the flow to subscriber attribute mapper 125 is intended to have access to stored subscriber and session attributes, for example, stored in an ISP database 155, or the like. The flow to subscriber attribute mapper 125 will search the subscriber attributes and session attributes associated with the flow and will map these attributes to a priority level based on the policies accessed by the policy module 125 that are intended to be preconfigured and stored in the storage 135 of the system.

If flow classification is intended to be based on application in addition to or instead of subscriber or session attributes, then the policy module 125 interacts with application to priority index mapper 120 and determines the priority index. Flow records are intended to include details about the flow, for example, the application of the flow, age of the flow, bytes seen for the flow, and the like. It also has the record of the subscriber to whom the flow belongs, including, for example, subscriber attributes such as, RAT-Type, Plan, and the like. When a flow goes through enhanced WRED, then a flow record is searched and retrieved for the configured flow/subscriber properties and then based on priority of those configured priorities packets are dropped.

Once the Flow properties are derived, then the priority of the flow is calculated based on the network policy.

In a particular example:
if FlowApplication is WhatsappVideo and Subscriber Plan is Gold: Set priority=1
if FlowApplication is FileDownload and Subscriber Plan is Gold: Set priority=5
if FlowApplication is Youtube and Subscriber Plan is Silver: Set priority=3
if FlowApplication is Youtube and Subscriber Plan is Gold: Set priority=2

Once a priority is determined, the priority of the flow is intended to be stored in the flow record in the flow storage 135.

The flow storage 135 is further configured to store the flow information, for example, 5 tuple information, (for example, client IP, server IP, server port, client port, layer 4 protocol like TCP, UDP and the like), flow state, and other flow data until the traffic flow ends. Once the priority index is set for the flow, the packet enters the enhanced WRED module 140 (sometimes referred to as the WRED module) and the WRED module 140 is configured to render a decision on the received packet based on drop probability. The incoming packet is assigned with priority index, this priority index is used to determine the drop probability by the enhanced WRED module 140. Higher the priority of the flow/packet (for example, an important flow determined by the system), lower the probability of the packet being dropped.

If the WRED module 140 determines the packet is to be dropped then, the IP header may be checked to determine if the ECN is supported for this flow. If ECN is supported, then the system may be configured to set CE bit (Congestion Experienced) notifying the congestion and the packet will be sent to the appropriate destination. The enhanced WRED module 140 is intended to determine whether to set the CE bit or to drop the packet. If ECN is not supported, then packet should be dropped by data plane.

Figure 7:
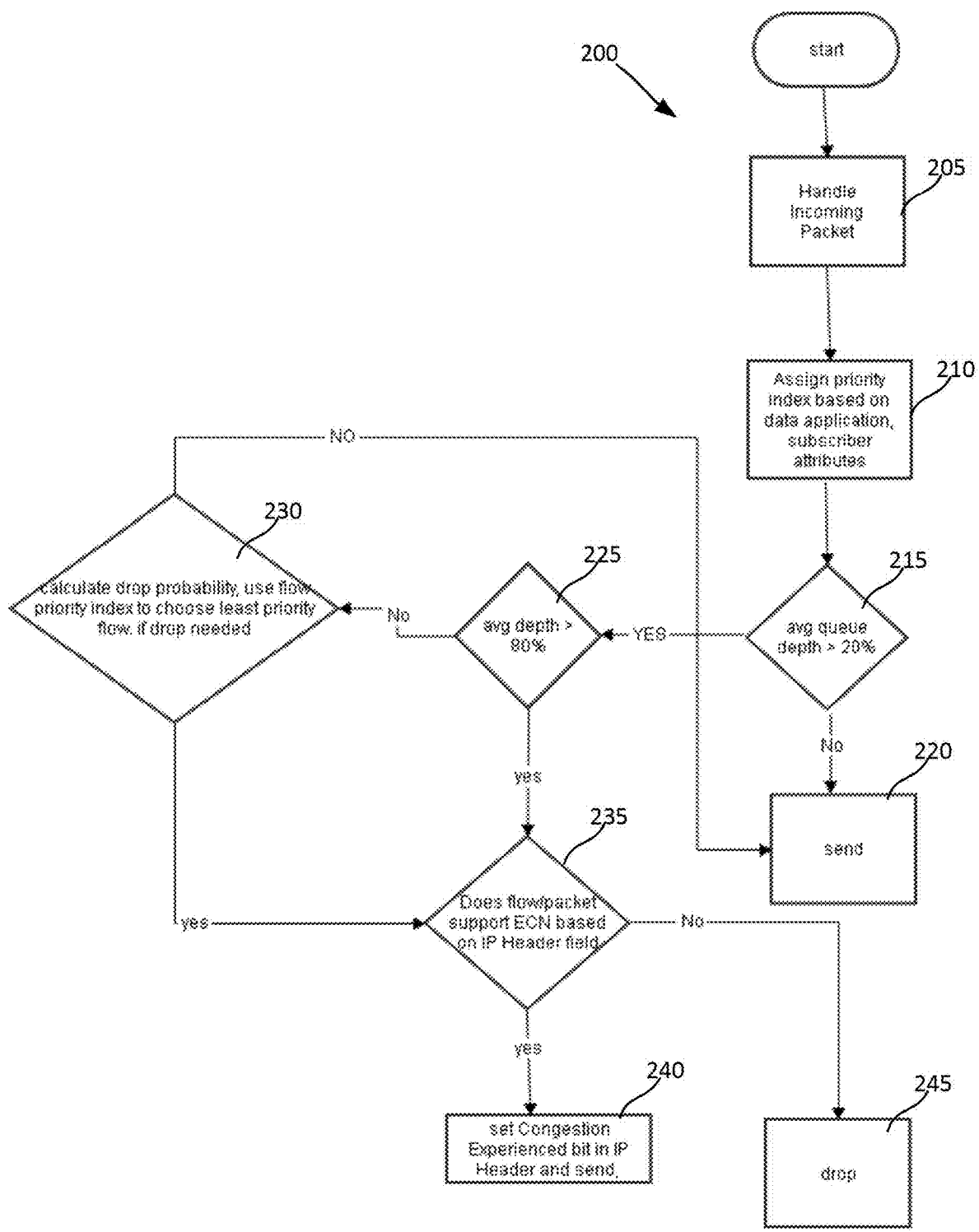
FIG. 7 illustrates a method for congestion management, according to an embodiment.

FIG. 7 illustrates a method 200 for congestion management for a computer network. The incoming packet is received, at 205. At 210, a priority index is assigned to the packet based on, for example, the subscriber attributes, session attributes, or application associated with the packet. At 215, the WRED module 140 is configured to then determine the average queue depth of the data plane or the shaper. If the average queue depth is below the minimum threshold, the packet will be sent to the destination, at 220.

At 225, if the queue is between the minimum threshold and the maximum threshold, the WRED module may determine the assigned priority index associated with the packet, at 230. Using the priority index and the based on the queue depth, the WRED module will determine whether the packet is to be dropped. The higher the priority (important flow) of the flow/packet, lower the probability of it getting dropped. Once the packet is decided to be dropped then, IP header may be checked to determine if the ECN is supported for this flow at 235, if supported then the system may set the CE bit (Congestion Experienced) notifying the congestion and packet will be sent to the destination, at 240. If ECN is not supported, then packet should be dropped by data plane, at 245. The drop probability calculator is intended to determine if the flow has already been dropped or not, via for example, a Boolean flag that has been set. It is intended to be configurable whether a previously dropped flow should be given least priority or higher priority.

Figure 8:
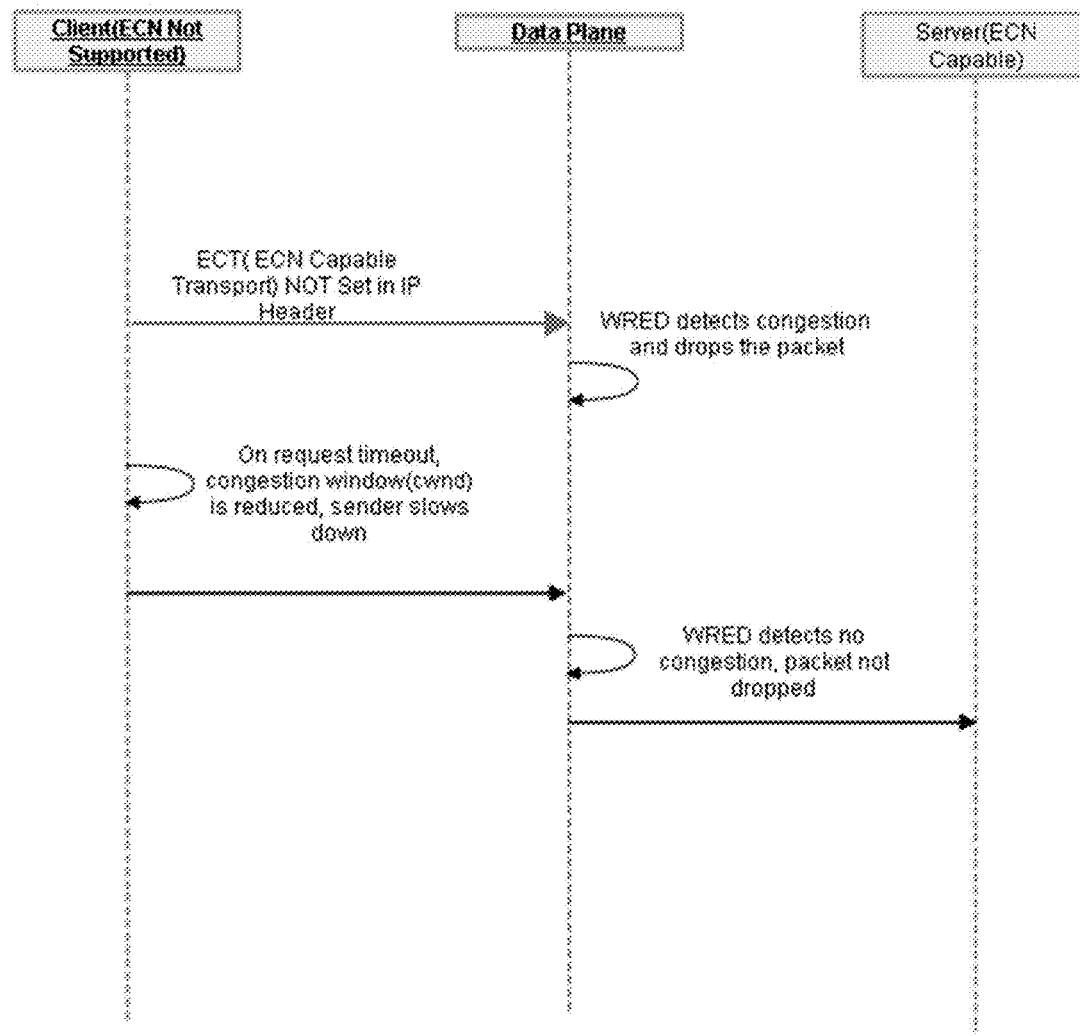
FIG. 8 illustrates a sequence diagram where ECN is not supported.

FIG. 8 illustrates a sequence diagram where ECN is not supported by the packet. In this example, the system receives a packet from a client and the WRED module determines that the network is congested and the packet should be dropped, so the packet is subsequently dropped. On request timeout, the sender will assume the network is congested and will slow down the sending speed. Once the new packet is received at the data place, the system may determine there is no longer a level of congestion where the packet should be dropped and sends the packet to the destination.

Figure 9:
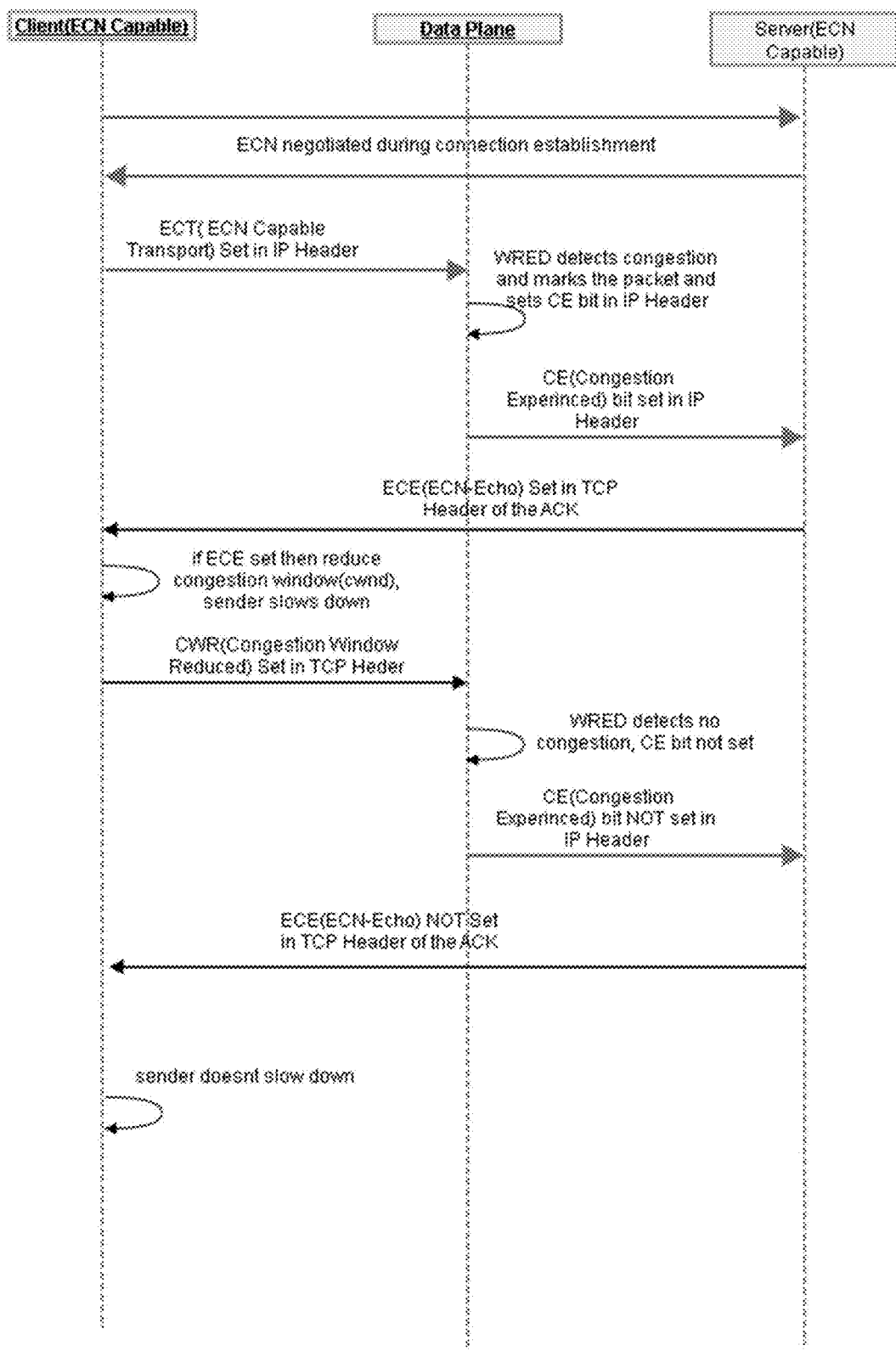
FIG. 9 illustrates a sequence diagram where ECN is supported.

FIG. 9 illustrates a sequence diagram where ECN is supported. ECN is intended to use the two least significant (or right-most) bits of the Traffic Class field in an IPv4 or IPv6 header to encode four different code points:

00—Non ECN-Capable Transport, Non-ECT
10—ECN Capable Transport, ECT(0)
01—ECN Capable Transport, ECT(1)
11—Congestion Encountered, CE.

When both endpoints of a traffic flow support ECN, each endpoint is intended to mark their packets with ECT (0) or ECT (1). The system may then treat the ECT (0) and ECT (1) codepoints as equivalent. If ECT is supported then data plane should change the code point to CE instead of dropping the packet. This act is referred to as "marking" and its purpose is to inform the receiving endpoint of impending congestion. At the receiving endpoint, this congestion indication is handled by the upper layer protocol (transport layer protocol) and is intended to be echoed back to the transmitting node in order to signal it to reduce its transmission rate.

From FIG. 9, a connection is established between a client and a server where ECN is determined at both endpoints. As the packet is ECN capable, this is intended to be noted in an IP header. When the WREN module detects congestion, the system is intended to mark the packet with the CE bit in the IP header and proceed with sending the packet to the destination, the server. The server will send an ACK to the client and echo the CE bit set in the TCP header. As the CE bit is set, the client will reduce the sending speed. The next packet sent will be with the congestion window reduced set. This is intended to be received by the system and the WRED module no longer detect congestion and amends the CE bit and forwards the packet to the server. The server responds to the client with an ACK where the EC bit is not set in the TCP header. The client no longer slows down the sending of the messages.

Generally, shapers may adjust traffic flows per APN, per location, per MVNO, per application, tethered/non-tethered, and the like. The rates of these shapers may be configured statically or configured dynamically through, for example, REST, over diameter from OCS/PCRF or the like.

The shapers are configured to have a queue for traffic. Whenever an incoming rate to the shaper is more than an outgoing rate, then the shaper starts queuing packets. If the incoming rate is lot higher than the shaper starts dropping packets as queue overflows. It will be understood that this is a similar scenario experienced by the data plane device and can introduce global synchronization and also affects QoS of all the flows belonging to the overflowing shaper. As packets are dropped, the network may include TCP retransmissions of the dropped packets, similar to the process detailed herein with respect to the data plane.

Figure 10:
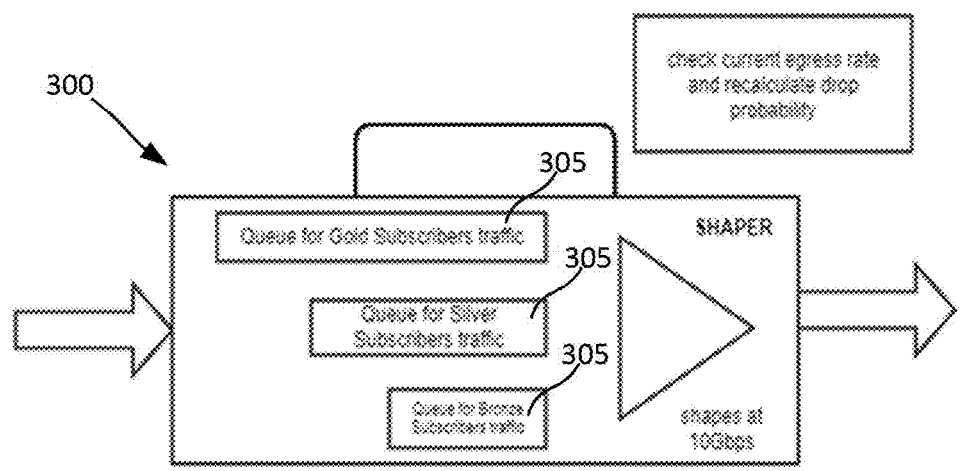
FIG. 10 illustrates a shaper with the use of the method for congestion management.

Embodiments of the system and method for congestion management are further intended to provide congestion management at a shaper in addition to or instead of at a data plane device. In particular, a shaper can have several queues, for example a queue for each traffic class as shown in FIG. 10. The queues may be configured to have different sizes. The queues of high priority traffic class may have a bigger queue size compared to the queue size of lowest priority index traffic. It will be understood that some shapers may have a single queue while other shapers may be configured with a plurality of queues. Depending on the configuration of the shaper, the system and method for congestion management may be implemented based on the shaper queue configuration.

FIG. 10 illustrates a shaper 300 according to an embodiment herein that may be used on data plane to limit traffic for the MVNO to 10 Gbps. The shaper is intended to have a plurality of queues 305 with varying sizes for the traffic from different subscribers. The shaper 300 is intended to be operatively connected with the system and the method for congestion management may be applied on all the queues 305 within the shaper, that way packets may be dropped at the same time. As the flows from same queue would not have lower QoS as drop probability tries to adjust the traffic burst by affecting fewer flows. If a packet is marked for drop action, then the CE bit in the IP header may be set if ECN is enabled in the IP header, otherwise the packet may be dropped. In this example, the shaper does not drop packets simultaneously, which is intended to solve any issues of global synchronization. Further, the queue of the prioritized flows is intended to be larger, thus providing subscribers with the gold plan better QoS than those of other subscriber levels.

In multi-queue implementation, there will be a plurality of queues one for each application or group. In the example shown in FIG. 10, there are 3 queues, 1 for gold subscribers, 1 for silver and 1 for bronze subscribers. In this example, the top tier subscriber's group queue is intended to be larger than those of other tiers. In this specific example, the size of the bronze queue could be 20, the size of the silver queue may be 20 (which would provide a total 40 as the bronze's queue is also used for silver subscribers) and the gold subscribers queue of size 60 (for a total of 100 because gold can use bronze and silver subscriber's queue as well). When a packet arrives for a gold subscriber, first bronze's queue is checked for space, if there is no space then silver's queue is checked for space, if no space in silver queue, then the packet will be queued in the gold subscriber's queue.

If packet for silver subscriber is received then the packet is first tried in bronze subscriber's queue, if no room there then silver subscriber's queue is used and if no room there as well then packet is dropped or CE bit may be set. If packet for bronze subscriber is seen, then it is queued in bronze subscriber's queue and if there is no room, then it is dropped or CE bit is set.

The parameters the system may use in the decision to drop a packet from the shaper may be based on, for example, the data applications, various subscriber or session attributes/properties, or the like.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for congestion management on a computer network, the method comprising:
   receiving a packet from a traffic flow;
   determining at least one subscriber attribute associated with the packet;
   determining a priority level for the packet based on the at least one subscriber attribute, wherein the at least one subscriber attribute is selected from the group consisting of: Access Point Network, Radio access technology, 5G traffic classification, location, roaming property, subscriber's plan, subscriber's quota consumption, and data applications;
   determining a queue depth for a queue in a data plane path of the packet comprising:
      determining a minimum congestion threshold for the queue;
      determining a maximum congestion threshold for the queue;
      if the queue depth is below the minimum congestion threshold, allowing all packets to be sent;
      if the queue depth is between the minimum congestion threshold and the maximum congestion threshold determining a sending priority level for packets;
      if the queue depth is above the maximum congestion threshold, dropping packets entering the queue; and
   determining whether to send or drop the packet based on the priority level of the packet and sending priority level based on the queue depth.

2. The method according to claim 1 wherein the minimum congestion threshold is 20% and the maximum congestion threshold is 80%.

3. The method according to claim 1, wherein dropping the packet comprises setting congestion experienced bit to congested.

4. The method according to claim 1, further comprising determining at least one other attribute associated with the packet, wherein the at least one other attribute comprises:
   at least one traffic flow attribute or at least one session attribute.

5. The method according to claim 4, wherein the at least one traffic flow attribute comprises application type for the traffic flow.

6. The method according to claim 1, further comprising:
   if the packet is dropped, flagging the traffic flow as having been previously dropped and
   determining the priority level of a subsequent packet of the traffic flow based on whether the traffic flow was flagged.

7. The method according to claim 1, wherein the queue is associated with a data plane device.

8. The method according to claim 1, wherein the queue is associated with a shaper.

9. The method according to claim 8, wherein the shaper comprises a plurality of queues and determining a queue depth for each queue.

10. A system for congestion management on a computer network, the system comprising:
    at least one processor configured to execute instructions stored in a memory wherein the instructions, when executed by the processor, provide for:
       an incoming packet handler configured to receive a packet from a traffic flow;
       an application detector configured to determine at least one subscriber attribute associated with the packet, wherein the at least one subscriber attribute is selected from the group consisting of: Access Point Network, Radio access technology, 5G traffic classification, location, roaming property, subscriber's plan, subscriber's quota consumption, and data applications;
       a policy module configured to determine a priority level for the packet based on the at least one subscriber attribute;
       an enhanced weighted random early detection module configured to determine a queue depth for a queue in a data plane path of the packet, wherein determining the queue depth comprises:
          determining a minimum congestion threshold for the queue;
          determining a maximum congestion threshold for the queue;
          if the queue depth is below the minimum congestion threshold, allowing all packets to be sent;
          if the queue depth is between the minimum congestion threshold and the maximum congestion threshold determining a sending priority level for packets;
          if the queue depth is above the maximum congestion threshold, dropping packets entering the queue; and
       determining whether to send or drop the packet based on the priority level of the packet and sending priority level based on the queue depth.

11. The system according to claim 10 wherein the minimum congestion threshold is 20% and the maximum congestion threshold is 80%.

12. The system according to claim 10, wherein the enhanced weighted random early detection module is configured to set a congestion experienced bit to congested instead of dropping the packet.

13. The system according to claim 10, wherein the policy module is configured to determine at least one other attribute, wherein the at least one other attribute comprises:
    at least one traffic flow attribute or at least one session attribute.

14. The system according to claim 13, wherein the at least one traffic flow attribute comprises application type for the traffic flow.

15. The system according to claim 10, wherein the enhanced weighted random early detection module is configured to:
    if the packet is dropped, flag the traffic flow as having been previously dropped and
    determine the priority level of a subsequent packet of the traffic flow based on whether the traffic flow was flagged.

16. The system according to claim 10, wherein the queue is associated with a data plane device.

17. The system according to claim 10, wherein the queue is associated with a shaper.

18. The system according to claim 17, wherein the shaper comprises a plurality of queues and determining a queue depth for each queue.

19. A system for congestion management on a computer network, the system comprising:
at least one processor; and
at least one memory comprising computer-readable instructions,
wherein the instructions, when executed by the processor, perform the following:
receive a packet from a traffic flow;
determine at least one subscriber attribute associated with the packet, wherein the at least one subscriber attribute is selected from the group consisting of: Access Point Network, Radio access technology, 5G traffic classification, location, roaming property, subscriber's plan, subscriber's quota consumption, and data applications; and
determine a priority level for the packet based on the at least one subscriber attribute;
determine a queue depth for a queue in a data plane path of the packet, wherein determining the queue depth comprises:
determining a minimum congestion threshold for the queue;
determining a maximum congestion threshold for the queue;
if the queue depth is below the minimum congestion threshold, allowing all packets to be sent;
if the queue depth is between the minimum congestion threshold and the maximum congestion threshold determining a sending priority level for packets;
if the queue depth is above the maximum congestion threshold, dropping packets entering the queue; and
determining whether to send or drop the packet based on the priority level of the packet and sending priority level based on the queue depth.

* * * * *